United States Patent [19]
Bussey

[11] Patent Number: 5,863,383
[45] Date of Patent: Jan. 26, 1999

[54] CONTINUOUS FORM SLEEVE BLANKS AND APPARATUS FOR APPLYING SAME

[76] Inventor: James W. Bussey, 13 Skipper St., Stonington, Conn. 06378

[21] Appl. No.: 600,763

[22] Filed: Feb. 13, 1996

[51] Int. Cl.⁶ .................................................. B29C 65/08
[52] U.S. Cl. ..................... 156/530; 156/73.3; 156/580.1; 53/582
[58] Field of Search ..................... 156/360, 378, 156/510, 515, 530, 580.1, 580.2, 583.1, 73.1, 73.3; 53/582

[56] References Cited

U.S. PATENT DOCUMENTS

| | | | |
|---|---|---|---|
| 4,151,900 | 5/1979 | Kirwan | 188/174 |
| 4,999,081 | 3/1991 | Buchanan | 156/515 |
| 5,275,674 | 1/1994 | Sayyadi et al. | 156/73.1 |
| 5,425,826 | 6/1995 | Sayyadi et al. | 156/73.1 |

*Primary Examiner*—James Sells
*Attorney, Agent, or Firm*—McCormick, Paulding & Huber

[57] ABSTRACT

A continuous form assembly of ultrasonically weldable sleeve blanks formed by an elongated flexible web has a longitudinal series of pairs of transversely spaced apart and generally longitudinally extending slits therethrough, each pair of slits partially defining an associated sleeve blank. Pin feed aperture formed in the longitudinally extending marginal portions of the web cooperate with a tractor feed mechanism of a sleeve forming apparatus to intermittently advance the web through the apparatus. An electrical conductor or groups of conductors manually fed into the apparatus engage the web and form an associated blank into a loop surrounding the conductor or group of conductors. Ultrasonic sealing and severing jaws simultaneously join opposite end portions of the sleeve blank together in assembly to form a tubular sleeve surrounding an associated portion of the individual conductor or a group of conductors and simultaneously sever the formed sleeve from the web. Identification information may be preprinted on the sleeve blanks which comprise the continuous form assembly where the sleeves are to be employed as identification markers for the conductors.

20 Claims, 5 Drawing Sheets

CONTINUOUS FORM SLEEVE BLANKS AND APPARATUS FOR APPLYING SAME

BACKGROUND OF THE INVENTION

This invention is concerned with annular bands and tubular sleeves of the type used as identification markers on a wide variety of articles, as, for example, the individual electrical conductors which comprise an electrical wiring harness, and apparatus for applying bands or sleeves to such articles. The invention is further concerned with annular bands or sleeves used to secure in assembly groups of two or more articles, such as axially elongated electrical conductors used in the manufacture of electrical wiring harnesses.

For many years tubular sleeves cut from extruded plastic tubing or like material have been used as identification markers or bands for axially elongated articles such as electrical conductors. Such tubing may comprise heat shrinkable material color coded or marked with alpha-numeric information to distinguish one banded article from other banded articles of generally like kind. However, such plastic tubing is not generally well-suited to receive printed material, which presents a problem where printed alpha-numeric information is required to assure proper identification. Further, when a sleeve or band cut from tubing is used to identify an associated axially elongated article having a substantially uniform cross section throughout its length, such as a cylindrical electrical conductor, the sleeve or band must generally be positioned at or near a terminal end portion of the conductor and have an inside diameter approximately equal to or only slightly greater than the outside diameter of the conductor so that it will remain in position near the terminal end of the conductor to facilitate conductor identification. Consequently, when a cut sleeve is used as a marker for such an electrical conductor the sleeve must be slipped onto the end portion of the conductor before the conductor can be terminated by application of an appropriate contact or other terminal element. The marker sleeve or band is usually manually applied, a time consuming operation which adds materially to the cost of the finished product.

The problem of printing alpha-numeric information on sleeves where specialized printing apparatus may not be available has been overcome, at least to some degree, by the provision of a continuous form assembly of flat tubular sleeve markers which may be conveniently fed through various types of commonly available printing equipment. A continuous form assembly of flat tubular sleeves of the aforedescribed type is illustrated and described in U.S. Pat. No. 4,361,230 to Downing et al., entitled Assembly Of Tubular Sleeve Markers, issued Nov. 30, 1982 and assigned to W. H. Brady Company, Milwaukee, Wis. The continuous form tubular sleeve assembly shown in the patent to Downing et al. comprises a multiplicity of preformed flat sleeve markers arranged in rows and columns and formed by two complementary webs joined together in face-to-face relation along spaced apart parallel seams and releasably secured to a carrier or base web. The printed preformed flat tubular sleeves which comprise the aforesaid continuous form assembly are separable from each other and individually detachable from the base web for individual use.

Although the use of a continuous form flat sleeve assembly of the aforedescribed type substantially reduces the cost of printing the required identification information on marker sleeves, problems associated with the manual application of the individual sleeves remain. After each flat sleeve has been detached from the carrier or base web it must be manually opened or spread from its flattened to its tubular form. A fid or like hand tool is usually employed to perform this manual sleeve opening operation. Like the cut tubular sleeve hereinbefore described, each opened flat tubular sleeve must be slipped axially onto the end of an article to be identified. Where the article is an electrical conductor, for example, this operation must be performed before the electrical conductor can be terminated. The aforesaid manual operations required to apply a flat tubular sleeve marker to an associated, article such as an electrical conductor, add substantially to the cost of producing the finished product.

Sleeve markers such as hereinbefore described have limited usage and are not suitable for banding together in assembly groups of articles, as, for example, groups of individual electrical conductors which may comprise a section of an electrical wiring harness. Manually applied tie strips are most often employed for the aforedescribed purpose.

Accordingly, it is the general aim of the present invention to provide a more cost effective system for applying bands or sleeves to axially elongated portions of individual articles to be marked for identification or for banding together in assembly groups of two or more such articles. It is a further aim of the present invention to provide an improved continuous form assembly of tubular sleeve blanks, which may be readily preprinted with selected information using conventional automated printing apparatus, for use as marker sleeves and/or bands for securing together in assembly groups of two or more such articles. A still further aim of the invention is to provide an apparatus for separating successive sleeve blanks from a continuous form assembly of sleeve blanks and simultaneously forming each separated blank into a tubular sleeve surrounding an associated portion of an individual article to be marked for identification or for banding together in assembly a group of two or more such articles.

SUMMARY OF THE INVENTION

In accordance with the present invention a continuous form assembly of sleeve blanks comprises a longitudinally elongated flexible web of ultrasonically weldable material having a longitudinal series of pairs of transversely spaced apart and generally longitudinally extending slits therethrough, each pair of slits partially defining an associated sleeve blank. Marginal feeding means on the flexible web cooperate with the feeding mechanism on an associated conventional printing apparatus and/or a sleeve forming apparatus embodying the invention to advance the web through the apparatus. Further, and in accordance with the invention, the sleeve forming apparatus separates each successive sleeve blank from the continuous form assembly and simultaneously joins opposite end portions of the sleeve blank together in assembly to form a tubular sleeve surrounding an associated portion of an individual article to be marked for identification or a group of articles to be banded together in assembly.

DETAILED DESCRIPTION OF PREFERRED EMBODIMENTS AND METHODS

Figure 1:
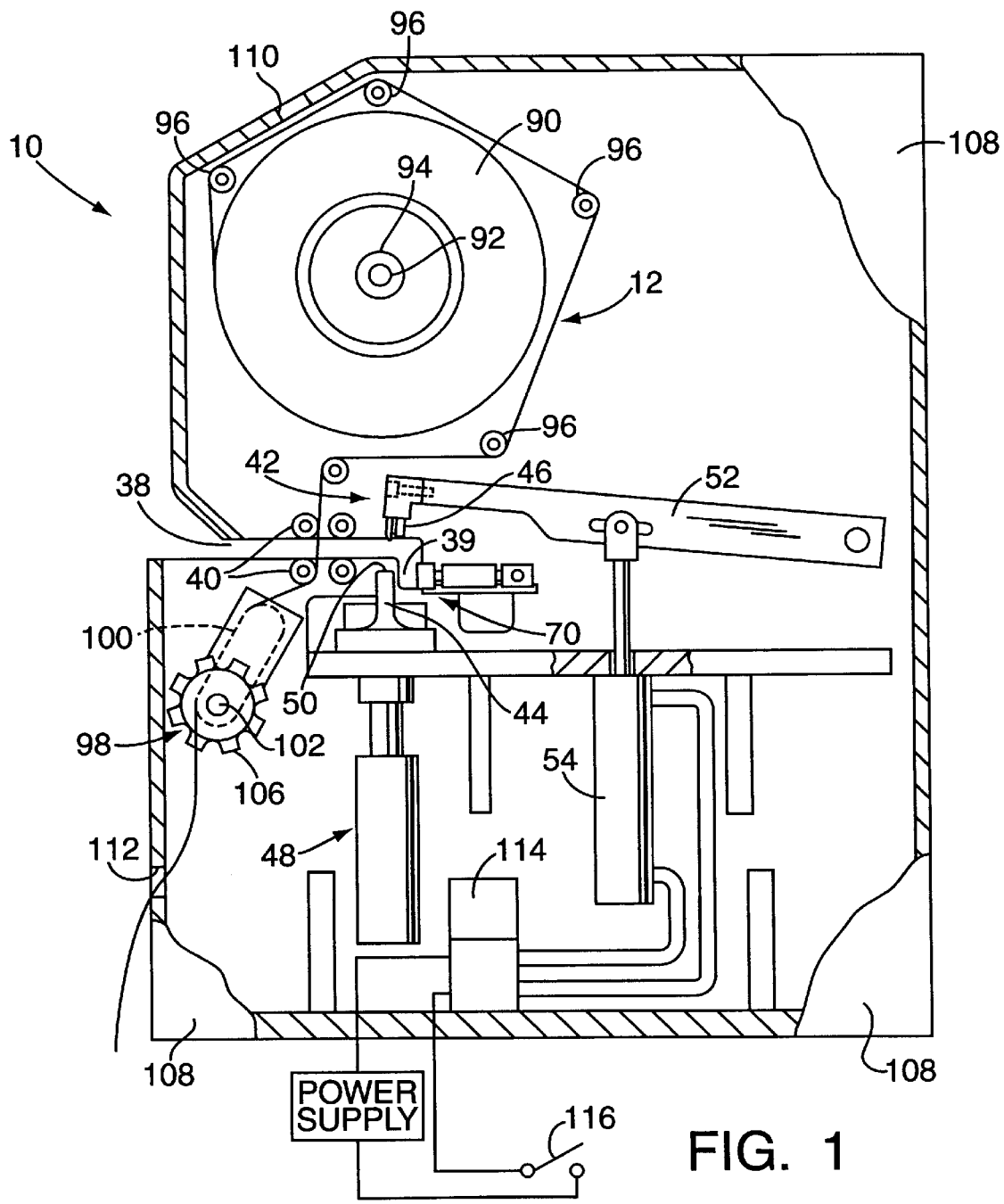
FIG. 1 is a side elevational view of an apparatus embodying the present invention shown with portions of the cover broken away.
Figure 2:
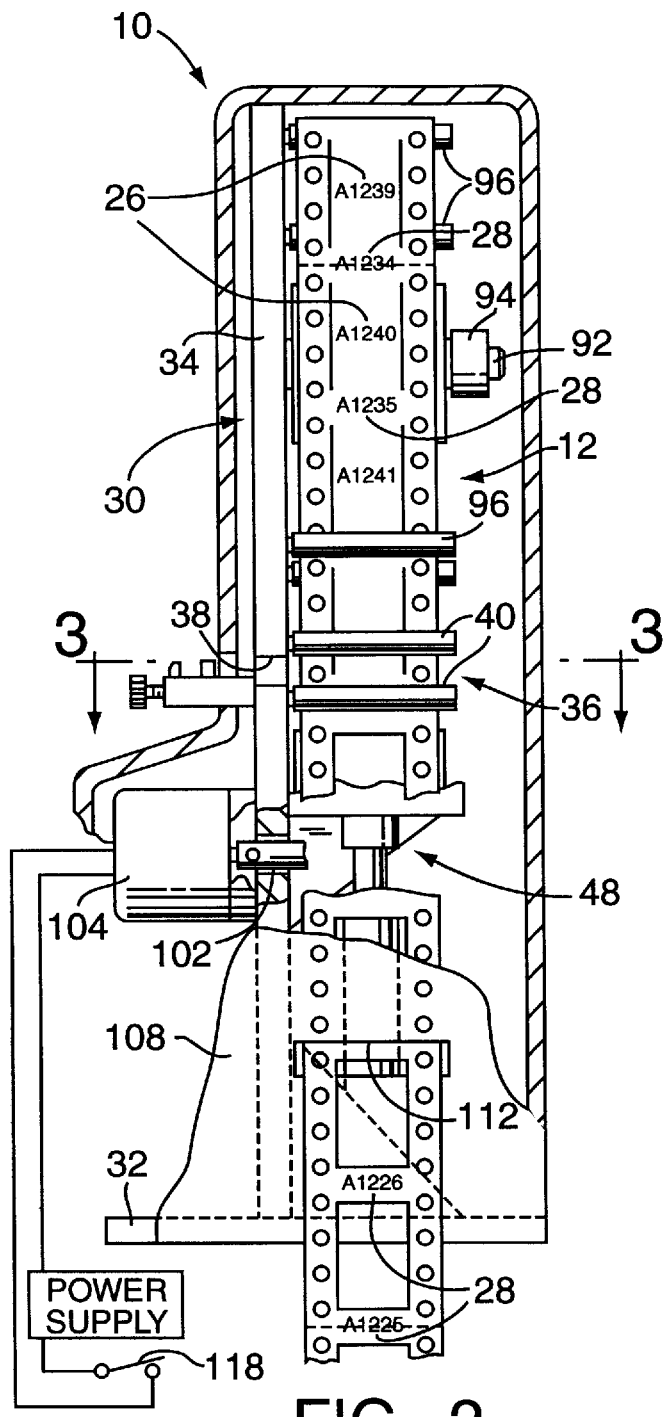
FIG. 2 is a front elevational view of the apparatus of FIG. 1 shown with portions of the cover broken away.

In the drawings and in the description which follows, the present invention is illustrated and described with reference to a band or sleeve forming apparatus indicated generally by the reference numeral 10 and shown in FIGS. 1–3. The illustrated apparatus 10 is particularly adapted to intermittently advance a continuous form assembly of band or sleeve blanks, designated generally by the reference numeral 12 in FIGS. 4 and 5, and form each successive blank which comprises the assembly into an annular band or tubular sleeve surrounding an associated portion of an article to be identified or group of articles to be assembled. The apparatus simultaneously separates each successive band or sleeve blank from the continuous form assembly 12 as a band or sleeve is formed from the blank.

Figure 6:
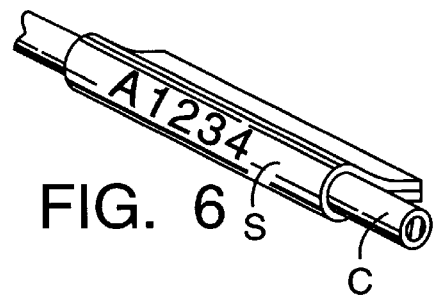
FIG. 6 is a somewhat enlarged fragmentary perspective view of a typical identification marker sleeve shown attached to an insulated electrical conductor.
Figure 7:
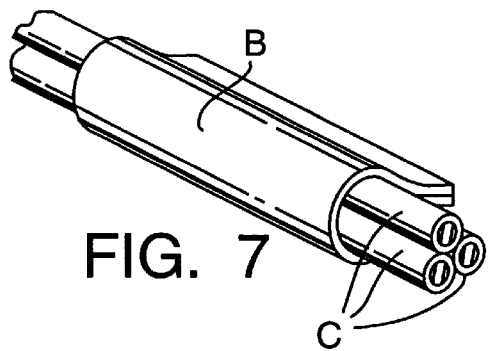
FIG. 7 is a somewhat enlarged fragmentary perspective view showing a typical group of electrical conductors secured in assembly by a band formed by the apparatus of the present invention.

The sleeve forming apparatus of the present invention may be employed to apply annular bands or tubular sleeves to a wide variety of articles. However, the illustrated band forming machine 10 is particularly adapted for use in the manufacture of an electrical wiring harnesses or the like. Such a harness (not shown) may comprise a multiplicity of individual axially elongated generally cylindrical insulated electrical conductors to be tagged or banded for identification and/or assembled into groups, each group including two or more individual electrical conductors. A typical preprinted identification marker sleeve formed by the apparatus of the present invention is shown in FIG. 6 attached to an individual insulated electrical conductor C, the sleeve being indicated by the letter S. In FIG. 7 there is shown a part of a wiring harness which includes a group of insulated electrical conductors C, C secured in assembled relation to each other by a band B formed by the apparatus 10.

Figure 4:
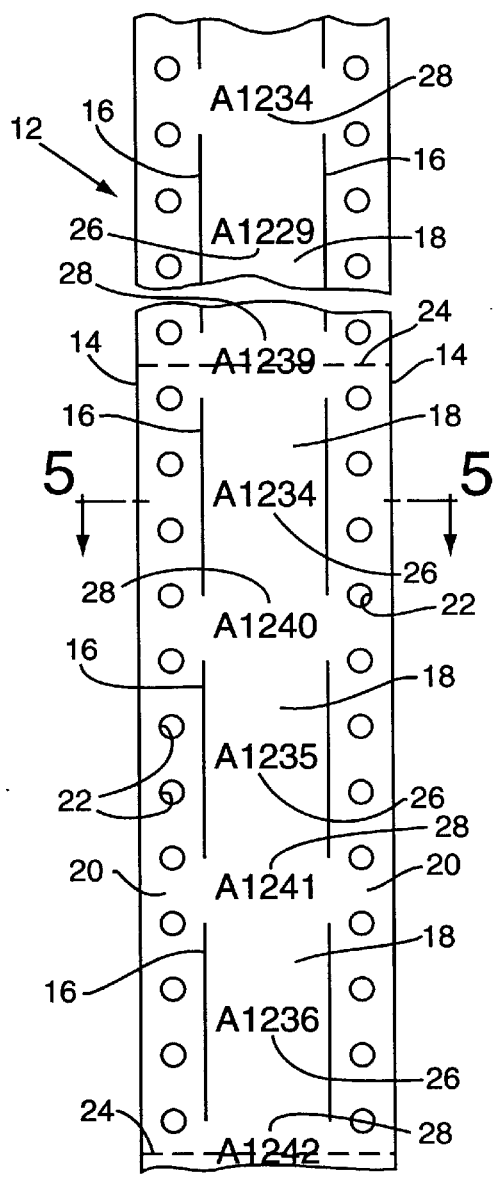
FIG. 4 is a fragmentary front elevational view of a portion of a continuous form assembly of sleeve blanks embodying the invention and for use with the apparatus of the present invention.
Figure 5:
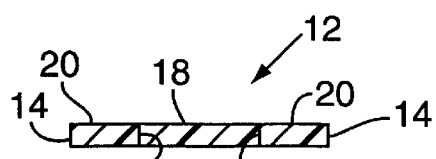
FIG. 5 is a sectional view taken along the line 5—5 of FIG. 4.

In order to facilitate a clear understanding of the band or sleeve forming apparatus 10, hereinafter described, and the manner in which it operates, the continuous form band or sleeve blank assembly 12 used with the apparatus will first be considered in some detail. Referring now particularly to FIGS. 4 and 5, the illustrated continuous form assembly 12 essentially comprises an elongated single ply web of ultrasonically weldable material, which may be heat shrinkable, and which has parallel longitudinally extending side edges 14, 14. A longitudinally spaced series of pairs of opposing, transversely spaced apart and longitudinally extending parallel slits 16, 16 through the web define a concatenated longitudinally series of band or sleeve blanks 18, 18 along the entire length of the web, each pair of slits 16, 16 partially defining an individual band or sleeve blank 18. The slits 16, 16 which comprise each pair are substantially parallel to each other and of substantially equal length. Each slit 16 is parallel to and is spaced inwardly from an associated web side edge 14. The slits 16, 16 cooperate with the web side edges 14, 14 to generally define marginal feed strips 20, 20 which extend along opposite side portions of the entire web. A longitudinally extending series of uniformly spaced apart pin feed apertures 22, 22 are formed in each of the marginal feed strips 20, 20, the feed apertures in one marginal feed strip 20 being in transverse alignment with those in the feed strip at the opposite side of the web. The feed apertures 22, 22 are adapted to cooperate with a pin feed or tractor drive mechanism which comprises a part of the sleeve forming apparatus 10, hereinafter further described. The longitudinal spacing between the feed apertures 22, 22 is standardized, one half inch spacing being presently preferred to conform to the spacing between the drive pins of a pin feed mechanism on an associated printing apparatus, such as a dot matrix printer (not shown), for a purpose which will be hereinafter evident. The sleeve blank assembly 12 further includes a longitudinally spaced apart series of lines of weakening 24, 24 which extend transversely across the web at uniform intervals along the web. Each line of weakening 24 is positioned on the web midway between the end portions of one pair of slits 16, 16 and the next successive pair of slits in the series. In accordance with a presently preferred construction the blanks 18, 18 which comprise the assembly 12 are divided into a longitudinal series of groups, each group comprising three consecutive blanks 18, 18 and being separated from the next three consecutive blanks in the series by an associated line of weakening 24, substantially as shown in FIG. 4.

When the sleeve blanks 18, 18 are to be used as identification markers for individual conductors or assembly bands for securing together and identifying groups of two or more conductors, for example, the continuous form assembly 12 is preferably feed through an automated printing apparatus, such as a dot matrix printer, to imprint conductor identification marks on each successive blank 18. The blanks 18, 18 which comprise the continuous form assembly 12 shown in FIG. 4 have alphanumeric code identification information imprinted thereon as indicated at 26, 26. Registration and confirmation marks indicated at 28, 28 are also imprinted at predetermined locations along the web which comprises the continuous form assembly 12, preferably in the spaces between successive blanks 18, 18, as shown in FIG. 4. Each registration and confirmation mark 28 is identical to an associated conductor identification mark 26 but is spaced longitudinally along the web a predetermined distance from the associated conductor identification mark 26, as will be hereinafter further discussed.

A band or sleeve forming apparatus embodying the present invention and utilizing the continuous form assembly 12 in practicing the invention may take various forms. However, the illustrated band or sleeve forming machine 10 is particularly adapted to perform a bench assembly operation and has a frame assembly indicated generally at 30 which includes a base member 32 and an upright support member or mounting plate 34 supported by the base member 32. A banding or sleeve forming station indicated generally at 36, is partially defined by a horizontally disposed guide slot 38 formed in the mounting plate 34 and opening outwardly through the forward end of the mounting plate as best shown in FIG. 1. The guide slot 38 defines an article receiving path and terminates at its inner end at an upwardly open notch 39 which defines a sleeve receiving position. A plurality of axially horizontally and vertically spaced apart generally cylindrical guide rollers 40, 40 supported in cantilever position on the mounting plate 34 for rotation above and below the guide slot 38 project horizontally from the right hand side of the mounting plate, as it appears viewed from the front and looking toward the rear in FIG. 3.

Figure 12:
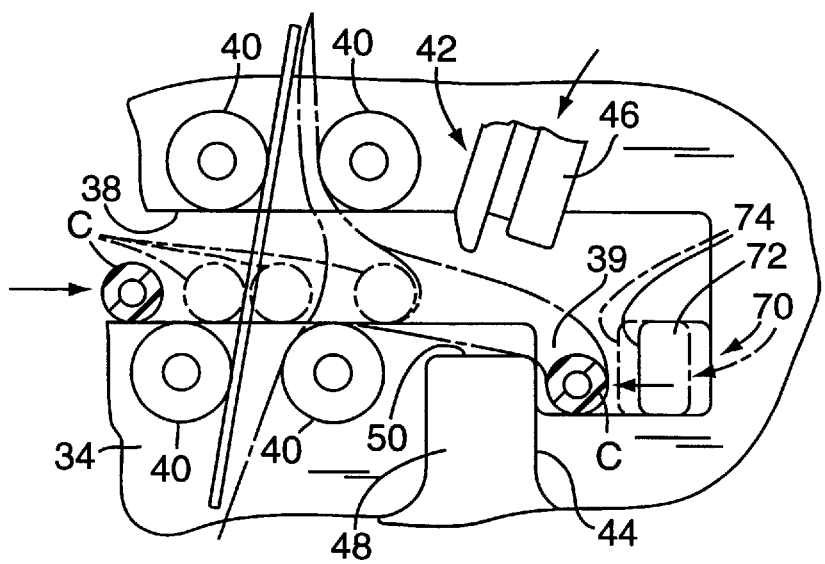
FIG. 12 is a somewhat enlarged schematic view illustrating the manner in which an electrical connector is fed into the apparatus for banding.

A pair of vertically opposing sealing and severing jaws indicated generally at 42 and which include a substantially stationary lower jaw 44 and a moveable upper jaw 46 are supported on the right side of the mounting plate 34 generally laterally adjacent the guide slot 38 and immediately rearward of the guide rollers 40, 40 and cooperate to define the forward or outer end of the band or sleeve forming station 36. The lower jaw 44 comprises the horn of an ultrasonic welder designated generally by the numeral 48 and secured to the mounting plate 34 below an associated portion of the guide slot 38 as best shown in FIG. 12. The lower jaw or horn 44 has a substantially planar generally horizontally disposed and upwardly facing horn surface 50. An elongated lever arm 52 pivotally supported at its rear end on the mounting plate 34 carries the upper jaw 46 and supports it for arcuate pivotal movement generally toward and away from the lower jaw 44 between closed and open positions. The upper jaw, normally biased toward its open position, pivots to its closed position in response to operation of an air motor or pneumatic cylinder 54 secured in fixed position relative to the mounting plate 34 and having a moveable part operably connected to the lever arm 52, substantially as shown in FIG. 1.

Figure 8:
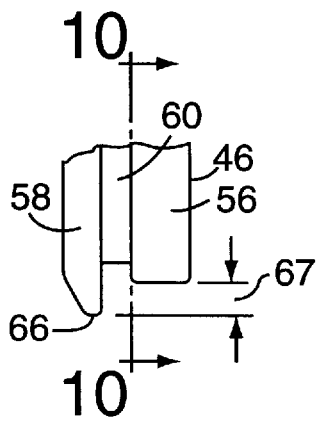
FIG. 8 is a somewhat enlarged side elevational view of the sealing and severing jaw.
Figure 9:
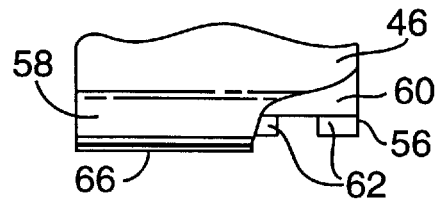
FIG. 9 is a front elevational view of the sealing and severing jaw shown in FIG. 8.
Figure 10:
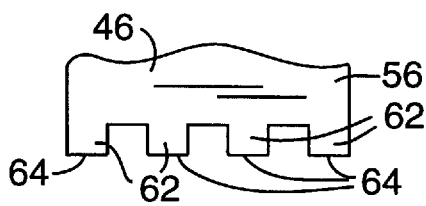
FIG. 10 is a fragmentary sectional view taken along the line 10—10 of FIG. 8.
Figure 11:
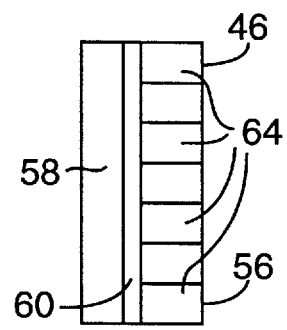
FIG. 11 is a bottom plan view of the sealing and severing jaw shown in FIG. 8.

Considering now the jaw assembly 42 in further detail, and referring particularly to FIGS. 8–10, the upper jaw 46 includes a sealing member 56 and a severing member 58, preferably maintained in generally horizontally spaced apart relation to each other by a separator or spacer 60. The sealing member 56 has a plurality of laterally spaced apart and downwardly projecting generally rectangular teeth 62, 62. The teeth define a laterally spaced apart series of substantially planar downwardly facing sealing surfaces 64, 64 which lie within a common plane for cooperating with the lower jaw or horn surface 50 when the upper and lower jaws 46 and 44 are in closed position. The severing member 58 is positioned forward of the sealing member 56 and has a generally rectilinear horizontally disposed and laterally extending lower edge 66 which also cooperates with the horn surface 50 when the jaws are in closed position as will hereinafter be further discussed. The rectilinear edge 66 has a lateral dimension substantially equal to the lateral width of a blank 18, shown in FIG. 4, is relatively blunt or dull, and preferably disposed a slight distance below the tooth surfaces 64, 64, as indicated at 67 in FIG. 8, to lead the tooth surfaces when the jaws are moved to closed position, a lead dimension 67 which is about equal to the thickness of the web being presently preferred.

Figure 3:
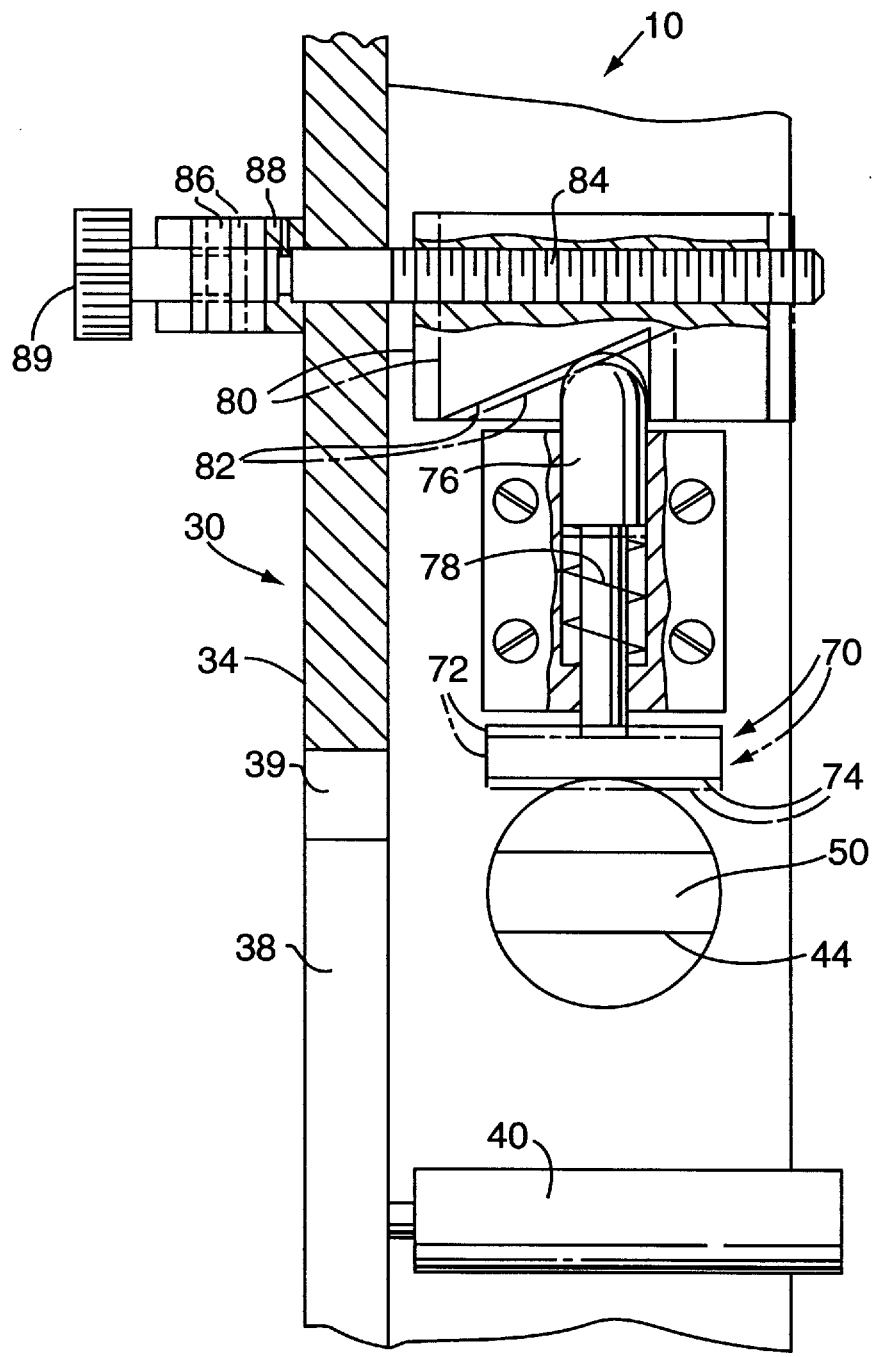
FIG. 3 is a somewhat enlarged fragmentary sectional view taken along the line 3—3 of FIG. 2.

An adjustable arresting mechanism, best shown in FIGS. 3 and indicated generally by the numeral 70, is mounted at the right hand side of the support plate 34 rearward of the jaw assembly 42 and near the rear end of the guide slot 38. The arresting mechanism 70 essentially comprises an adjustable abutment member 72 which has a forwardly facing abutment surface 74 which is generally laterally aligned with the notch 39. The abutment member 72 is supported for forward and rearward adjustable movement generally toward and away from the lower jaw 44 and includes a rearwardly extending cam follower 76 biased in a rearward direction by a follower spring 78 as shown in FIG. 3. The arresting mechanism 70 further includes a camming member 80 supported for lateral movement generally toward and away from the mounting plate 34. The camming member 80 has a cam surface 82 disposed in camming engagement with the cam follower 76. An adjusting screw 84 threadably engaged with the camming member 80 extends through the support plate 34 and is threadably engaged with a moveable caliper jaw 86 supported for lateral movement relative to a fixed caliper jaw 88 mounted in fixed position relative to the mounting plate 34. The position of the abutment surface 74 relative to the jaw assembly 42 is adjusted by rotating an adjustment knob 89 mounted on an end of the adjusting screw 84. Rotation of the adjustment knob 89 in one or the opposite direction opens or closes the caliper jaws and simultaneously synchronously adjusts the position of the abutment surface 74 relative to the lower jaw assembly 44 in response to changes in the setting of the caliper jaws, as will be hereinafter more fully discussed in connection with the operation of the apparatus 10.

Various arrangements may be provided for feeding successive sleeve blanks 18, 18 which comprise the continuous form assembly 12 to the machine 10. However, in accordance with the presently preferred machine construction the web material which comprises the continuous form assembly 12 is payed off a supply roll 90 mounted on an arbor 92 which is supported on and projects axially outwardly from the mounting plate 34 at a location above the guide slot 38. An adjustable drag clutch 94 releasably secured to the outer or free end of the arbor 92 retains the supply roll 90 on the arbor and cooperates with a hub which supports the supply roll 90 to control pay-off of the web material from the supply roll. A plurality of axially horizontally disposed web support rollers 96, 96 are mounted in cantilever position on the support plate 34 in circumaxial relation to the supply roll 90, substantially as shown in FIGS. 1 and 2, and support and track the web material from the supply roll to the machine work station.

A tractor feed mechanism, indicated generally at 98 (FIG. 1) is provided for advancing the web which forms the continuous form assembly 12 through the machine 10. The tractor feed mechanism 98 preferably comprises a drive belt 100 mounted at the right hand side of the support member 34 below the guide slot 38 and forward of the guide rollers 40, 40, substantially as shown in FIG. 1. The illustrated belt 100 comprises a flexible timing belt mounted on associated sprockets and includes two laterally spaced apart rows of drive pins for engaging the feed apertures 22, 22 in an associated continuous form sleeve blank assembly 12 in a manner well known in the art. One of the sprockets which supports the drive belt 100 comprises a drive sprocket fixed to a drive shaft 102 which extends through the support plate 34. The drive sprocket is drivingly connected to an electrical stepping motor 104 shown in FIG. 2 and mounted on the left hand side of the mounting plate 34. An adjusting knob 106 mounted on the free end of the drive shaft 102 facilitates manual adjustment of the drive belt 100, for a purpose which will be hereinafter further evident.

The machine 10 also includes a housing or removable cover indicated at 108. A substantial portion of the cover 108 is shown broken away in the drawings to reveal the structure of the apparatus contained therewithin. However, it should be noted that a registration and conformation marker viewing window 110 is provided in the upper portion of the cover 108 for a purpose which will be hereinafter further explained. A scrap discharge slot 112 is also formed in the front wall of the cover at a location below the tractor feed mechanism 98.

In accordance with the presently preferred construction, the machine 10 is operated by an electropneumatic control system which includes an electropneumatic control valve 114 for supplying air under pressure from an air supply source (not shown) to the pneumatic cylinder 54, a foot operated control switch 116 for operating the control valve 114 to initiate the machine operating cycle, and a plurality of timing devices (not shown) for controlling the machine operating cycle during which a single identification sleeve or assembly band is normally formed and attached to a single electrical conductor (FIG. 6) or group of conductors (FIG. 7). The control system may also include a manually operated override control switch 118 shown somewhat schematically in FIG. 2 for bypassing the foot operated control switch 116 during machine setup operations to supply power directly to the stepping motor 104 to continuously operate the tractor feed mechanism 98.

When the machine 10 is used to apply identification sleeves to articles, as, for example, individual cylindrical insulated electrical conductors C, C such as shown in FIG. 6, to be used in the fabrication of a wiring harness, appropriate identification code information is preprinted on the continuous form blank assembly 12 at locations 26, 26 and 28, 28 along the sleeve blank assembly, as shown in FIG. 4, by advancing the assembly 12 through a programmable printer, as hereinbefore discussed. The preprinted continuous form sleeve blank assembly received from the printing apparatus is then wound to form a supply roll 90 having the printed material on its outer or exposed surface.

After the preprinted supply roll 90 has been mounted in the arbor 92 and secured thereon by the drag clutch 94 the drag clutch is adjusted to apply a light force to resist the pay-off of web material pulled from the supply roll 90 by the tractor feed mechanism 98. The leading end portion of the web which preferably comprises an unprinted leader strip, is threaded over the various support rollers 96, 96, between the guide rollers 40, 40, into engagement with the tractor feed mechanism 98, and outwardly through the scrap discharge slot 112 in the front wall of the machine housing or cover 108.

When the continuous form blank assembly 12 has been threaded through the machine 10 the machine is operated to bring the registration and conformation mark 28 which corresponds to the first conductor identification mark 26 into registration with the viewing window 110 thereby enabling the machine operator to confirm that the correct blank 18 is in proper position to be applied to the first electrical conductor C to be identified. The distance between each conductor identification mark 26 and the corresponding registration and confirmation mark 28 is substantially equal to the distance from the viewing window 110 to the abutment surface 74 measured longitudinally along the web threaded through the machine 10. Since the foot operated control switch 116 normally employed to operate the machine produces a single machine operating cycle each time the switch is operated, thereby intermittently moving or indexing the continuous form assembly 12, the override control switch 118 is preferably employed to continuously advance the assembly 12 during setup. If necessary, the manually adjustable adjusting knob 106 may be used to make a fine adjustment to bring the first registration and confirmation mark 28 into registration with the viewing window 110.

Preparatory to operating the apparatus 10 to form a first preprinted blank 18 into an identification marker sleeve S on a first cylindrical electrical conductor C in a series, as shown in FIG. 6, the caliper jaws 86 and 88 are adjusted to measure the diameter of the conductor C which automatically properly positions the adjustable abutment surface 74 relative to the notch 39 at the inner or rear end of the guide slot 38.

The machine operator grasps the first conductor C at a position spaced from its free end portion to which the identification marker sleeve is to be attached. The free end portion of the conductor is then inserted into the guide slot 38 and moved rearwardly against the portion of the web exposed between the guide rollers 40, 40 and to the rear or inner end of the guide slot and into the notch 39 drawing with it a portion of the web pulled from the supply roll 90 and causing the web which includes a sleeve blank 18 to form a loop about the conductor C, as illustrated in FIG. 12. While the tractor mechanism 98 holds the leading portion of the web in stationary position the drag clutch 94, which has been set to apply light tensioning force to the web, allows the supply roll to pay-off a sufficient amount of the web material to form the loop about the conductor as the machine operator moves the conductor free end portion against the web and toward the rear or inner end of the guide slot 38.

After the loop has been formed and the conductor C has been positioned in the notch 39 the operator depresses the foot operated control switch 116 to initiate the machine operating cycle which closes the jaws 42 on the loop. A first timing device (not shown) associated with the ultrasonic welder 48 causes the jaws to dwell in closed position applying a predetermined force to the end portions of the loop defined by the blank 18. While the jaws remain in closed position the ultrasonic welder 48 operates for a predetermined period of time to enable the teeth 62, 62 on the sealing member 56 to cooperate with the horn surface 50 to seal the coengaging end portions of the loop to form a sleeve about the conductor C while the severing member 58 simultaneously cooperates with the ultrasonically vibrating horn surface 50 to sever the formed loop from the web, which comprises the continuous form blank assembly 12. Upon completion of the ultrasonic welding and severing operation another timing device (not shown) causes the jaws 42 to open and dwell in open position for a sufficient time to allow the operator to remove the conductor C with the formed sleeve S thereon from the machine.

It should be noted that the marginal feed strips 20, 20 are not severed by the sleeve forming and severing operation. After the operator has had an opportunity to remove the sleeved conductor from the machine the timing mechanism operates supplying power to the stepping motor 104 which activates the track feed mechanism 98 to advance the web and position the next preprinted blank between the guide rolls 40, 40, as shown in FIG. 1 in preparation for the next machine operating cycle. The web scrap produced by the operating cycle leaves the machine through the scrap discharge slot 112. The lines of weakening 24, 24 enable a leading portion of the web scrap to be torn off from time-to-time to facilitate more convenient scrap disposal.

If the ultrasonically weldable material used to form the continuous form assembly 12 is head shrinkable heat may be applied to the sleeve S which has been formed on the conductor C by the machine 10 to shrink the sleeve into tightly gripping engagement with the conductor C.

The invention has been illustrated and described with reference to a machine particularly adapted for bench operation. However, it is anticipated that situations will be encountered where a portable or hand held apparatus for applying bands or sleeves may be required, as, for example, where identification sleeves are to be applied to the conductors of a wiring harness in place on a panel board or the like. It should now be apparent that the apparatus 10 hereinbefore described is readily adaptable for use as a portable tool in substantially any position of orientation and such modified forms of the apparatus are contemplated within the scope of the invention.

I claim:

1. Apparatus for forming and attaching a sleeve of ultrasonically weldable material in axially surrounding relation to an axially extending portion of at least one article, said apparatus comprising a frame and having a work station, guide means for defining an article receiving path extending into said work station, article a pair of opposing jaws at said work station, mounting means for supporting said jaws for movement toward each other and to a closed position and away from each other and to an open position, said jaws in said open position being disposed at opposite sides of said path, one of said jaws comprising an ultrasonic welding horn, the other of said jaws comprising a welding and severing tool, a plurality of guide members at opposite sides of said article receiving path, said guide members extending generally transversely of the direction of jaw movement, means for supporting an elongated continuous form assembly of sleeve blanks to extend across said path between said guide members in the general direction of jaw movement with one of the sleeve blanks in predetermined position relative to said article receiving path, said guide members comprising sleeve forming means for forming the one of the sleeve blanks into a loop about an axially extending portion of the at least one article in response to movement of the axially extending portion of at least one article into engagement with the one of the sleeve blanks and between the guide members and along said article receiving path to said work station, controlling means for initiating a cycle of operation of said apparatus, jaw actuating means for moving said jaws from said open position to said closed position in response to the operation of said controlling means, means for maintaining said jaws in said closed position for a predetermined dwell period and returning said jaws to said open position, and indexing means for advancing the continuous form assembly of sleeve blanks to locate another of the sleeve blanks in a predetermined position relative to said article receiving path after said jaws have returned to said open position.

2. Apparatus for forming and attaching a sleeve of ultrasonically weldable material as set forth in claim 1 wherein said controlling means is further characterized as manually operated controlling means.

3. Apparatus for forming and attaching a sleeve of ultrasonically weldable material as set forth in claim 2 wherein said apparatus includes arresting means at the inner end of said work station for arresting movement of an article moving along said article receiving path and into said work station.

4. Apparatus as set forth in claim 1 wherein said guide members comprise rollers journalled in fixed position on said frame for rotation about parallel axes extending generally transversely of the direction of jaw movement.

5. Apparatus as set forth in claim 1 wherein said welding and severing tool includes a sealing member and a severing member.

6. Apparatus as set forth in claim 1 wherein said indexing means includes transversely spaced apart drive members for drivingly engaging opposite longitudinally extending marginal portions of the continuous form assembly of sleeve blanks and said welding and severing tool has a transverse dimension less than the transverse spacing between said drive members, whereby a sleeve is formed by the one of the sleeve blanks and severed from the continuous form assembly of sleeve blanks without severing the marginal portions of the continuous form assembly of sleeve blanks.

7. Apparatus as set forth in claim 6 wherein said loop forming means comprises axially parallel guide roller located above and below said article guide path.

8. Apparatus as set forth in claim 5 wherein said sealing member is spaced from said severing member.

9. Apparatus as set forth in claim 8 wherein said sealing member is separated from said severing member by a spacer positioned therebetween.

10. Apparatus as set forth in claim 8 wherein said severing member is laocated between said member and said sleeve forming means.

11. Apparatus as set forth in claim 10 wherein said severing member has a substantially dull rectilinear severing edge facing in the direction of said horn and said sealing member has a sealing edge spaced from said severing edge in a direction away from said horn.

12. Apparatus as set forth in claim 4 wherein said article guiding means comprises a forwardly open slot in said frame.

13. Apparatus as set forth in claim 1 including an arresting member at at said work station and adjusting means for moving said arresting member toward and away from said jaws.

14. Apparatus as set forth in claim 13 wherein said first adjusting means includes an adjustable caliper mechanism having moveable caliper jaws for measuring said one article and wherein said arresting member moves in response to movement of said caliper jaws.

15. Apparatus as set forth in claim 1 wherein said indexing means comprises a tractor feed mechanism for positive driving engagement with the continuous form assembly of sleeve blanks.

16. Apparatus as set forth in claim 15 including tensioning means for maintaining in tension a portion of the continuous form assembly of sleeve blanks advanced by said indexing means.

17. Apparatus as set forth in claim 16 wherein the continuous form assembly of sleeve blanks is fed from a supply roll and said tensioning means comprises a drag clutch associated with the supply roll.

18. Apparatus for forming a sleeve from an elongated web of ultrasonically weldable material and attaching the sleeve to an axially extending portion of at least one article, said apparatus comprising a frame, article guiding means for defining an article guide path disposed generally horizontally relative to said frame and having a forward end and a rear end, said rear end defining a sleeve receiving position, indexing means for intermittently advancing an elongated web ultrasonically weldable material along a web path extending in a generally vertically transverse direction across said guide path forward of said sleeve receiving position and including horizontally spaced apart web drive members for drivingly engaging opposite longitudinal and generally vertically extending marginal portions of the web, loop forming means mounted in fixed position on the frame and along said guide path for forming a loop of web material about an axially extending portion of at least one article in respond to movement of the at least one article from a position forward of the web path and into engagement with the web and along said guide path and to said sleeve receiving position with the axis of the at least one article extending in a horizontally transverse direction relative to said guide path, a pair of opposing jaws movable relative to each other between open and closed positions and supported on said frame along said guide path between said loop forming means and said sleeve receiving position, one of said jaws being disposed below said guide path, the other of said jaws being disposed above said guide path, an ultrasonic welder having a horn defining one of said jaws, the other of said jaws comprising a sealing member and a severing member extending transversely of said guide path and having a transverse dimension less than the transverse spacing between said spaced apart web drive members, and jaw operating means for moving said jaws from said open position to said closed position, whereby a sleeve is formed from a loop of web material formed about the at least one article at the sleeve receiving position and the sleeve is severed from the web without severing associated marginal portions of the web.

19. Apparatus for forming a sleeve from an elongated web of ultrasonically weldable material and attaching the sleeve to an axially extending portion of at least one article, said apparatus comprising a frame, article guiding means for defining an article guide path disposed generally horizontally relative to said frame and having a forward end and a rear end an arresting member defining the rear end of said sleeve receiving position and having a forwardly facing arresting surface, indexing means for intermittently advancing an elongated web ultrasonically weldable material along a web path forward of said arresting surface and extending in a generally vertically transverse direction across said guide path forward of said sleeve receiving position and including horizontally spaced apart web drive members for drivingly engaging opposite longitudinal and generally vertically extending marginal portions of the web, loop forming means mounted in fixed position on the frame and along said guide path for forming a loop of web material about an axially extending portion of at least one article in respond to movement of the at least one article from a position forward of the web path and into engagement with the web and along said guide path and to said sleeve receiving position with the axis of said at least one article extending in a horizontally transverse direction relative to said guide path, a pair of opposing jaws movable relative to each other between open and closed positions and supported on said frame along said guide path between said loop forming means and said sleeve receiving position, one of said jaws being disposed below said guide path, the other of said jaws being disposed above said guide path, an ultrasonic welder having a horn defining one of said jaws, the other of said jaws comprising a sealing member and a severing member extending transversely of said guide path and having a transverse dimension less than the transverse spacing between said spaced apart web drive members, and jaw operating means for moving said jaws from said open position to said closed position, whereby a sleeve is formed from a loop of web material formed about the at least one article at the sleeve receiving position and the sleeve is severed from the web without severing associated marginal portions of the web.

20. Apparatus for forming a sleeve from an elongated web of ultrasonically weldable material and attaching the sleeve to an axially extending portion of at least one article, said apparatus comprising a frame, article guiding means for defining an article guide path disposed generally horizontally relative to said frame and having a forward end and a rear end an arresting member defining the rear end of said sleeve receiving position and having a forwardly facing arresting surface, indexing means for intermittently advancing an elongated web ultrasonically weldable material along a web path forward of said arresting surface and extending in a generally vertically transverse direction across said guide path forward of said sleeve receiving position and including horizontally spaced apart web drive members for drivingly engaging opposite longitudinal and generally vertically extending marginal portions of the web, loop forming means mounted in fixed position on the frame and along said guide path for forming a loop of web material about an axially extending portion of at least one article in respond to movement of the at least one article from a position forward of the web path and into engagement with the web and along said guide path and to said sleeve receiving position with the axis of said at least one article extending in a horizontally transverse direction relative to said guide path, a pair of opposing jaws movable relative to each other between open and closed positions and supported on said frame along said guide path between said loop forming means and said sleeve receiving position, one of said jaws being disposed below said guide path, the other of said jaws being disposed above said guide path, an ultrasonic welder having a horn defining one of said jaws, the other of said jaws comprising a sealing member and a severing member extending transversely of said guide path, jaw operating means for moving said jaws from said open position to said closed position, and adjusting means for moving said arresting member toward and away from said jaws and including an adjustable caliper mechanism having movable caliper jaws for measuring the at least one article and moving the arresting member in response to the movement of said caliper jaws whereby a sleeve is formed from a loop of web material formed about the at lest one article at the sleeve receiving position and the sleeve is severed from the web.

* * * * *